(12) United States Patent
Walters

(10) Patent No.: US 6,454,940 B1
(45) Date of Patent: Sep. 24, 2002

(54) RETENTION OF FILTER ELEMENTS

(75) Inventor: Joseph Charles Henry Walters, Rockhampton (AU)

(73) Assignee: Madison Filter 981 Limited, Haslingden (GB)

( * ) Notice: Subject to any disclaimer, the term of this patent is extended or adjusted under 35 U.S.C. 154(b) by 0 days.

(21) Appl. No.: 09/764,987
(22) PCT Filed: Jul. 15, 1999
(86) PCT No.: PCT/GB99/02282

§ 371 (c)(1),
(2), (4) Date: Apr. 23, 2001

(87) PCT Pub. No.: WO00/04975
PCT Pub. Date: Feb. 3, 2000

(30) Foreign Application Priority Data

Jul. 22, 1998 (GB) .............................................. 9815831

(51) Int. Cl.[7] ........................ B01D 33/23; B01D 33/073
(52) U.S. Cl. ........................ 210/232; 210/331; 210/345; 210/402; 210/486
(58) Field of Search .............................. 210/232, 330, 210/331, 402, 345, 486

(56) References Cited

U.S. PATENT DOCUMENTS 3,042,206 A * 7/1962 Olender
3,283,906 A  11/1966 Crane et al. ................. 210/232
3,331,512 A   7/1967 Vore ............................ 210/487
4,219,412 A * 8/1980 Hassall
4,330,405 A * 5/1982 Davis et al.
4,661,245 A * 4/1987 Rutherford et al.
4,921,602 A * 5/1990 Fröderberg et al.
5,104,521 A * 4/1992 Rutherford
5,360,541 A * 11/1994 Gerakios
5,377,846 A * 1/1995 Askew

FOREIGN PATENT DOCUMENTS

FR     1306302      2/1963
FR     2 345 194   10/1977
WO      97/24170    7/1997

* cited by examiner

Primary Examiner—Thomas M. Lithgow
(74) Attorney, Agent, or Firm—Jacobson Holman, PLLC

(57) ABSTRACT

A filtration apparatus comprises a plurality of filtration sections such as (12, 13), each covered on both opposed faces by a filter cloth (14). Each filter cloth (14) is formed with a compressible edge bead (26) which is received in a corresponding groove (22–25) in a member (20) which extends between the sections (12, 13). The grooves each have an orifice for reception of the edge beads which is less than the diameter of the groove. Member (20) has a hollow core (21) to receive a sector dividing stem (17) to pass along and reinforce the member (20).

20 Claims, 2 Drawing Sheets

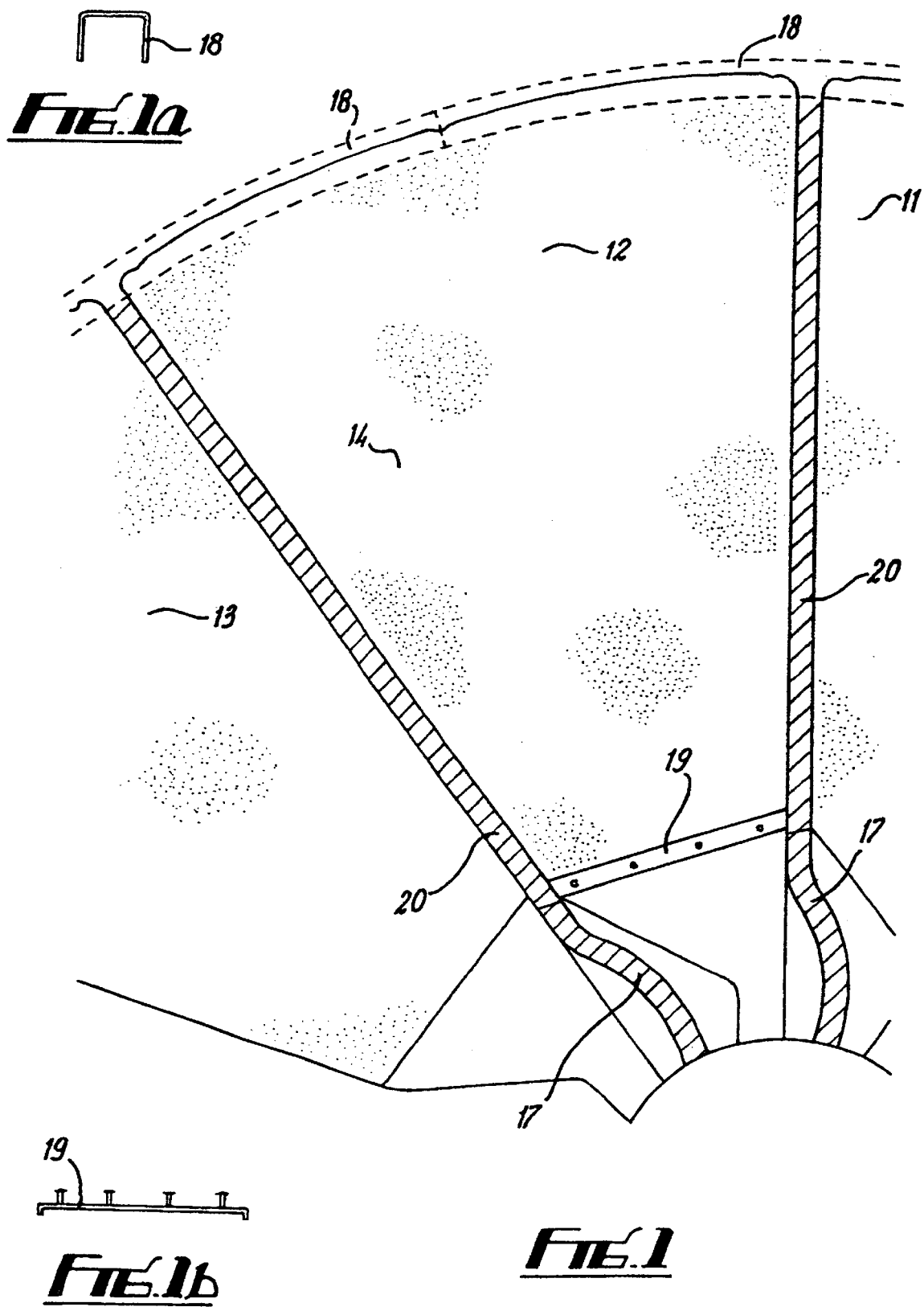

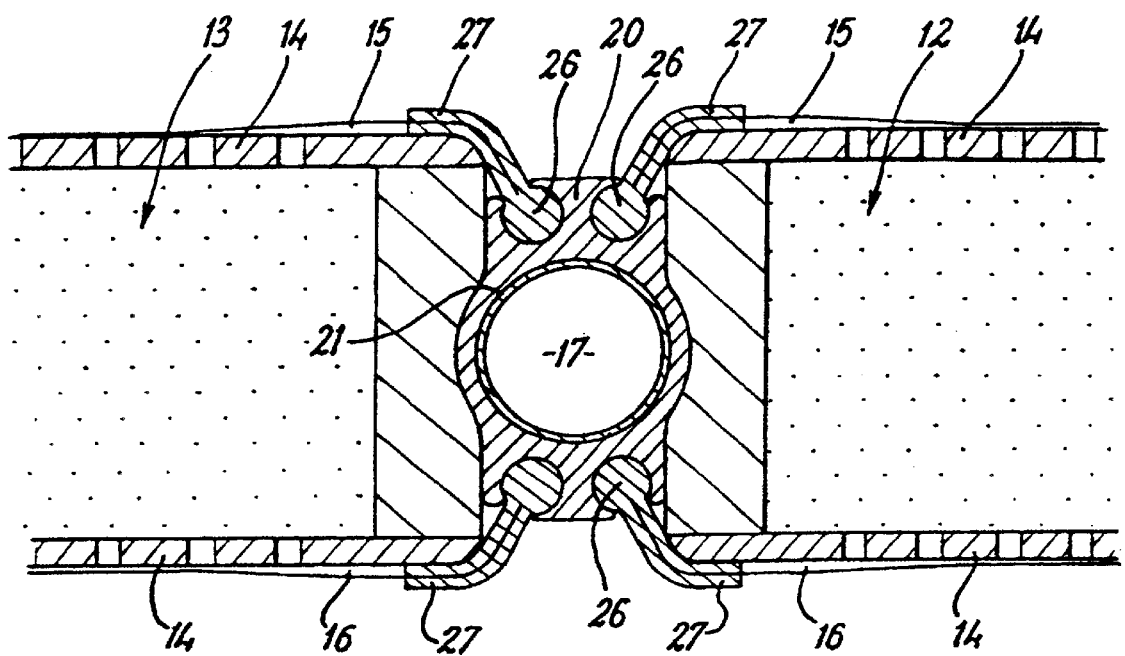
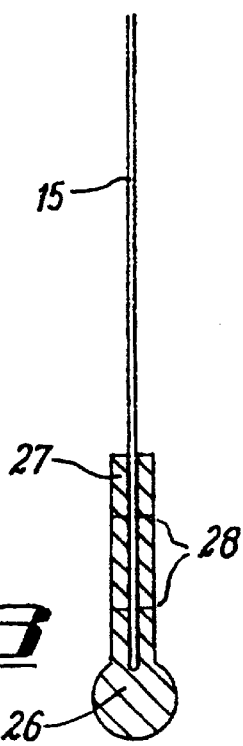
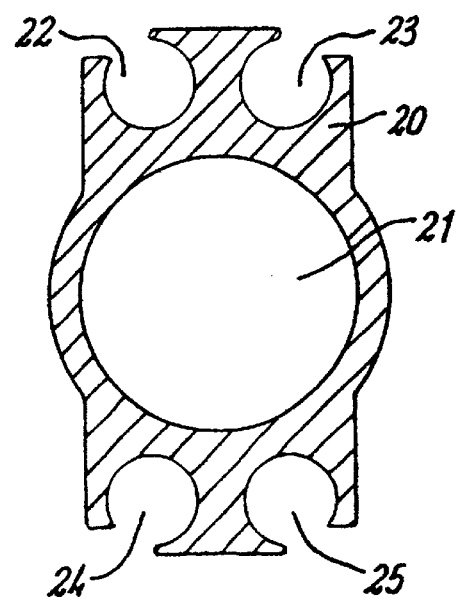

RETENTION OF FILTER ELEMENTS

BACKGROUND OF THE INVENTION

1. Field of the Invention

This invention relates to the retention of filter elements, principally in the art of vertically rotating disc filters, each composed of a plurality of filter segments.

2. Related Art

Examples of such filters are described in U.S. Pat. No. 3,283,906 to Crane and U.S. Pat. No. 3,331,512 to Vore. Each segment comprises a generally wedge shaped hollow plate with perforated surface webs, covered on each side with an appropriate filter cloth. Liquid is drawn into the cavities within the plate, through the filter cloths by suction achieved by known means, as the respective sector is dipped into an unfiltered slurry or other prefiltrate. Particles above the retention threshold of the filter cloths are retained by the filter cloths, whilst liquid and fine particles below the threshold pass into the interior of the segment plate, and are pumped therefrom. On emergence from the bath of unfiltered slurry, to be exposed to the air, the cake of retained particles on the filter cloth can be removed by scrapers or other known means.

Disc filters of this kind are commonly used in filtration of minerals such as coal dust, ores or the like. Each filter disc may comprise 8 to 12 sectors, each from 0.4 to 1.8 m in height, and two or three skilled workers may be needed to fit and remove each sector, which in known filters is required in order to remove old filter cloths, and fit replacements. A complete installation may comprise up to 200 filter wheels or more and the operation of changing filter cloths may take several days, as each sector may occupy 2–3 workers to remove, dress and re-fit so that each wheel may represent a full day's work for each team employed.

SUMMARY OF THE INVENTION

An object of the invention is to provide means for retention of filter cloths on the segments of a disc filter, which will enable the filter cloths to be removed and replaced quickly and easily, and without removal of the segment from the wheel.

According to the invention, in a filtration apparatus, wherein the apparatus comprises two or more adjacent filtration sections, there is provided means for retaining at least one filter element over each filtration section, comprising an elongate member extending between adjacent filtration sections, said elongate member having respective grooves therein to receive an edge bead provided in each filter element.

Preferably the bead, or at least the lips of the grooves are of flexible material, to enable the bead to be pushed into and pulled from the grooves.

The filtration apparatus is preferably a vertical disc filter of the kind described above, but may be a horizontal pan filter, comprising a similar assembly of a plurality of segments, or a drum filter comprising a plurality of part cylindrical panels.

In the case of a disc filter, the elongate member may have a hollow core, to enable a sector dividing stem to pass along the elongate member. These stems provide mechanical strength to the structure of the disc.

In a preferred embodiment, the elongate member comprises an extrusion of profiled cross section of a hard plastics material, such as polypropylene, polyethylene or polyamide or a blend of two or more thereof, or of a lightweight metal such as aluminium or an alloy thereof. Two grooves may be provided at each side of the member to receive the edges of two filter cloths, one on each face, of each of the sectors abutting the elongate member.

The bead on each filter cloth edge is preferably an elastomeric extrusion, of e.g. natural or synthetic rubber or the like, which can be deformed to be forced into the respective groove, or to be pulled out from it. The bead may be formed with flaps or rods between which an edge of a filter cloth may be received, and secured for example by at least one of stitching or welding. It is noted that the bead is preferably made of a softer material than the elongate member.

The grooves of the elongate member are preferably circular in cross section, set deeper than their radius, so that they present an orifice slit which is less than the diameter of the groove, thereby forcing compression of the bead for insertion or withdrawal, and acting to retain the bead in normal use.

The invention also provides filtration apparatus comprising two or more adjacent filtration sections. Each section being provided with one or more filter elements, and retaining means for retaining the filter elements. The retaining means comprising an elongate member extending between adjacent filtration sections. The elongate member having a respective groove therein for receiving an edge bead provided on each filter element.

BRIEF DESCRIPTION OF THE DRAWINGS

These together with other objects and advantages which will become subsequently apparent reside in the details of construction and operation as more fully hereinafter described and claimed, reference being had to the accompanying drawings forming a part hereof, wherein like numerals refer to like parts throughout.

A preferred embodiment of the invention will now be described by way of example, with reference to the accompanying drawings, wherein:

FIG. 1 is a diagrammatic view of one segment of a vertical disc filter embodying the invention;

FIG. 1a is a detail of an edge cap;

FIG. 1b is a side view of a lock-down bar used to secure a filter cloth near the hub of the disc;

FIG. 2 is a detailed sectional view of an elongate member in place between two adjacent disc segments;

FIG. 3 is a sectional view of the edge of a filter cloth used in the filter; and FIG. 4 is a cross section of the elongate member.

DESCRIPTION OF THE INVENTION

Although only one preferred embodiment of the invention is explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to fro the sake of clarity. It is to be understood that each specific term includes all technical equivalents which operate in a similar manner to accomplish a similar purpose.

The disc segments are separated by generally radial sector stems 17 which provide mechanical strength to the construction of the disc.

The radially outer edges of the segments are covered by rectangular trough-shaped sector caps 18, which also clamp the outer edges of the filter cloths 15, 16.

The radially inner edges of the filter cloths 15, 16 are secured by a lock-down bar 19 on each face of the segment, secured by Tec screws. The bar 19 can be easily secured and released, using a screwdriver.

The radially extending edges of each segment are separated by elongated members 20, in the form of extrusions from e.g. polyamide. The members 20 each have an axial passage 21, through which extends a respective sector stem 17.

The member 20 is generally rectangular in shape and is situated between the adjacent sector plates 14, 15 of adjacent segments, with the longer faces in-abutment with the plates. The shorter faces of the member 21 are each provided with a pair of circular cross sectioned grooves 22, 23 in the upper face and 24, 25 in the lower face. Each groove opens with a slot which is narrower than the diameter of the groove. For example, the diameter of the groove is typically 9 mm, whilst the width of the slot is typically 4 mm.

Each groove 22, 23, 24, 25. receives an edge bead 26 on the edge of a respective filter cloth 15, 16. Each edge bead 26 is secured to the filter cloth by means of flaps 27 between which the cloth is inserted, and secured by stitching 28.

The edge bead 26 is of a flexible or at least deformable synthetic material, or a rubber or the like. The bead 26 is capable of being deformed to enter the slot of the respective groove, or to be pulled out from the groove.

In use, a disc filter is dressed by simply removing the respective sector caps 18 to release the radially outer edges of the filter cloths, then the lock-down bars 19 are detached. The used filter cloths can then be removed by pulling the edge beads 26 from their respective grooves. in the elongate member 20. Replacement clean filter cloths are fitted by the reverse procedure, that is pushing their edge beads 26 into the grooves in the member 20, and then securing the lock-down bars 19 and the sector caps 18.

Instead of requiring two or three workers over an hour, because the sector does not have to be disconnected, changing filter cloths on a segment can be carried out by one person in about 10 minutes. Consequently, dressing. a complete installation of 200 disc filters may take about 400 man-hours, as opposed to 7200 man-hours approximately for the prior art installation.

Existing installations may be modified to conform with the invention.

In a pan filter or a rotary drum filter, the elongate members would be solid with no passage through the middle.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A filtration apparatus comprising a disc made up of a plurality of segments, said segments being separated by radially extending elongate members and each said segment comprising perforated plates enclosing an interior volume, and a filter cloth each covering a respective face of said segment being formed having an integral edge bead, the improvement comprising said elongate members each including a hollow core to receive a reinforcing member and provided with pairs of grooves each receiving the edge bead on the edge of a respective filter cloth for retaining the edges of said filter cloths.

2. The filtration apparatus according to claim 1, wherein said lips of said grooves are of flexible material, to enable said bead to be pushed into and pulled from said grooves.

3. The filtration apparatus according to claim 1, wherein said elongate member comprises an extrusion of a profiled cross section of a relatively hard plastics material, and has two grooves provided at each side of said member to receive said edges, and said edge beads carried thereby, of two filter cloths, one on each face, of each of said filtration section abutting said elongate member.

4. The filtration apparatus according to claim 1, wherein said bead on each filter cloth edge is an elastomeric extrusion which can be deformed to be forced into said respective groove.

5. The filtration apparatus according to claim 1, wherein said bead is formed with flaps between which an edge of a filter cloth is received, and secured by stitching, and is of a softer material than said elongate member.

6. The filtration apparatus according to claim 1, wherein said grooves in said elongate member are of circular cross section and set deeper than their radius, so that they present an orifice which is less than a diameter of said groove.

7. The filtration apparatus according to claim 1, wherein said elongate member comprises an extrusion of a profiled cross section of a lightweight metal, and has two grooves provided at each side of said member to receive said edges, and said edge beads carried thereby, of two filter cloths, one on each face, of each of said filtration section abutting said elongate member.

8. The filtration apparatus according to claim 1, wherein said bead on each filter cloth edge is an elastomeric extrusion which can be deformed to be pulled out from the groove.

9. The filtration apparatus according to claim 1, wherein said bead is formed with flaps between which an edge of a filter cloth is received, and secured by welding, and is of a softer material than said elongate member.

10. The filtration apparatus according to claim 1, wherein said bead is formed with rods between which an edge of a filter cloth is received, and secured by stitching, and is of a softer material than said elongate member.

11. The filtration apparatus according to claim 1, wherein said bead is formed with rods between which an edge of a filter cloth is received, and secured by welding, and is of a softer material than said elongate member.

12. A filtration apparatus which comprises a plurality of filtration sections, each said section covered by a filter cloth, and each said filter cloth formed with an integral compressible edge bead which is received in a corresponding groove in a member which extends between said sections, each said groove having an orifice for reception of said edge beads and said orifice being less than a diameter of said groove, and said member having a hollow core to receive a sector dividing stem.

13. The filtration apparatus according to claim 12, wherein each said groove having lips of a flexible material for enabling said edge beads to be pushed into and pulled from said groove.

14. The filtration apparatus according to claim 12, wherein said edge bead on each said filter cloth is an elastomeric extrusion for forcing into each said groove.

15. The filtration apparatus according to claim 12, wherein said edge bead is formed with flaps between which an edge of each said filter cloth is received, and secured by stitching, and is of a softer material than said elongate member.

16. The filtration apparatus according to claim 12, wherein said edge bead is formed with flaps between which an edge of each said filter cloth is received, and secured by welding, and is of a softer material than said elongate member.

17. The filtration apparatus according to claim 12, wherein said edge bead is formed with rods between which an edge of each said filter cloth is received, and secured by welding, and is of a softer material than said elongate member.

18. The filtration apparatus according to claim 12, wherein each said groove are of circular cross section and are set to form an orifice which is less than a diameter of said groove.

19. The filtration apparatus according to claim 12, wherein said member comprises an extrusion of a profiled cross section of a lightweight metal, and has two grooves provided at each side of said member to receive said bead edges, and said edge beads carried thereby, of two filter cloths, one on each face, of each of said filtration section abutting said elongate member.

20. The filtration apparatus according to claim 12, wherein said edge bead on each filter cloth edge is an elastomeric extrusion which can be deformed for pushing in and pulling out from the groove.

* * * * *